United States Patent
Negele

(10) Patent No.: US 9,605,717 B2
(45) Date of Patent: Mar. 28, 2017

(54) SYNCHRONIZER RING FOR A SYNCHRONIZATION UNIT OF A MANUAL TRANSMISSION AND METHOD FOR MANUFACTURING SUCH SYNCHRONIZER RING

(71) Applicant: HOERBIGER Antriebstechnik Holding GmbH, Schongau (DE)

(72) Inventor: Berthold Negele, Schwabsoien (DE)

(73) Assignee: HOERBIGER Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 14/731,301

(22) Filed: Jun. 4, 2015

(65) Prior Publication Data

US 2015/0354638 A1 Dec. 10, 2015

(30) Foreign Application Priority Data

Jun. 5, 2014 (DE) .................. 10 2014 107 926

(51) Int. Cl.
| | |
|---|---|
| *F16D 23/02* | (2006.01) |
| *F16D 23/06* | (2006.01) |
| *B21J 5/12* | (2006.01) |
| B21D 53/16 | (2006.01) |
| B21D 53/26 | (2006.01) |

(52) U.S. Cl.
CPC .............. *F16D 23/025* (2013.01); *B21J 5/12* (2013.01); *B21D 53/16* (2013.01); *B21D 53/26* (2013.01); *F16D 2250/0023* (2013.01)

(58) Field of Classification Search
USPC .................................................. 192/53.32
See application file for complete search history.

(56) References Cited

U.S. PATENT DOCUMENTS

| | | | | |
|---|---|---|---|---|
| 5,036,719 | A * | 8/1991 | Razzacki | F16D 23/025 192/53.34 |
| 6,588,563 | B1 * | 7/2003 | Sarrach | F16D 23/025 192/53.32 |
| 2012/0030929 | A1 * | 2/2012 | Merklein | B21D 37/16 29/592 |

FOREIGN PATENT DOCUMENTS

| | | |
|---|---|---|
| DE | 3225364 | 1/1984 |
| DE | 10063053 | 7/2001 |

(Continued)

OTHER PUBLICATIONS

Search Report for DE 10 2014 107 926.4 (mailed Feb. 11, 2015).

*Primary Examiner* — Robert Hodge
*Assistant Examiner* — Ryan Dodd
(74) *Attorney, Agent, or Firm* — Klarquist Sparkman, LLP

(57) ABSTRACT

A synchronizer ring for a synchronization unit of a manual transmission has a ring axis and is formed of a ring-shaped sheet-metal cone with a substantially constant sheet thickness. The ring-shaped sheet-metal cone has a cone-shaped radial outer side and an opposite radial inner side with a cone-shaped friction surface, wherein on its radial outer side the sheet-metal cone includes an integrally molded centering collar for radially centering the synchronizer ring relative to a synchronizer hub of the synchronization unit. The sheet-metal cone is deformed in the region of the centering collar and includes a first sheet portion with a residual thickness reduced as compared to the sheet thickness and axially adjacent a second sheet portion with a collar thickness which at least corresponds to the sheet thickness. The residual thickness of the sheet-metal cone is substantially constant in the first sheet portion.

14 Claims, 3 Drawing Sheets

(56) References Cited

FOREIGN PATENT DOCUMENTS

| DE | 102005050477 | 4/2007 |
|----|--------------|--------|
| DE | 102011015836 | 10/2012 |
| GB | 2357815 | 11/2003 |
| WO | WO2007/045309 | 4/2007 |

* cited by examiner

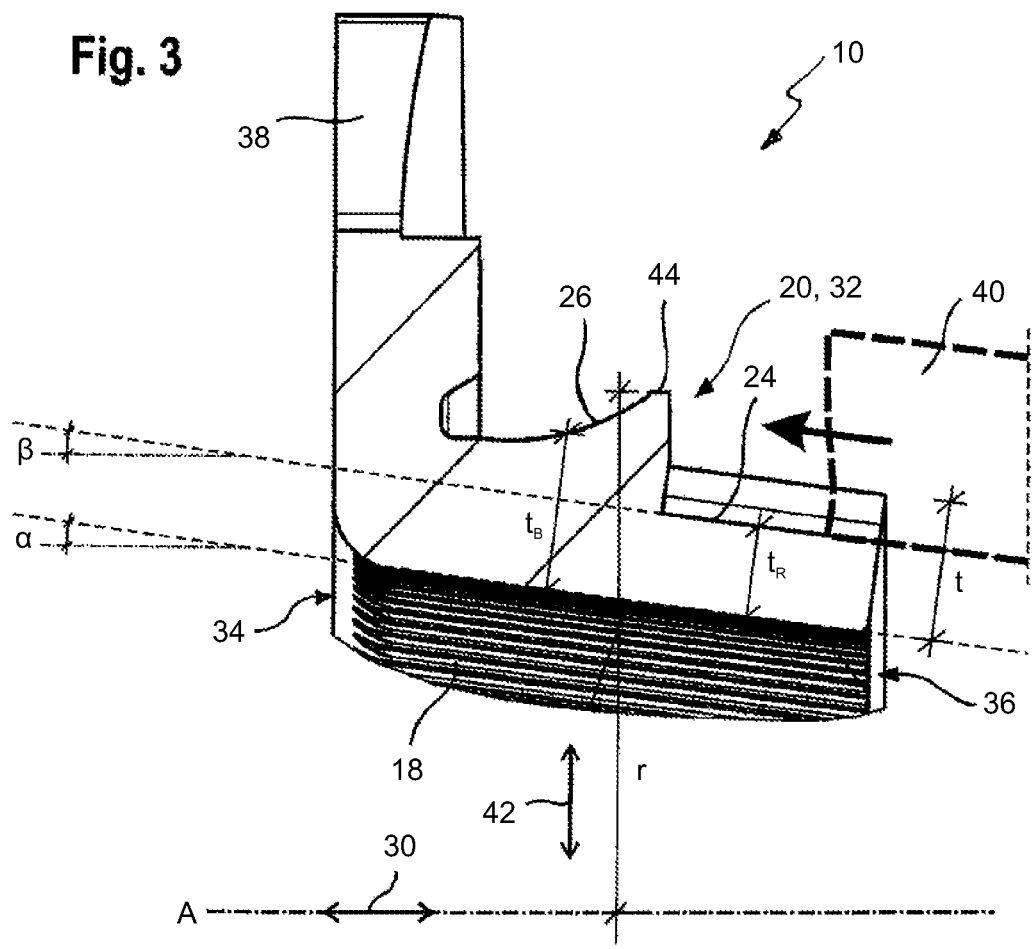
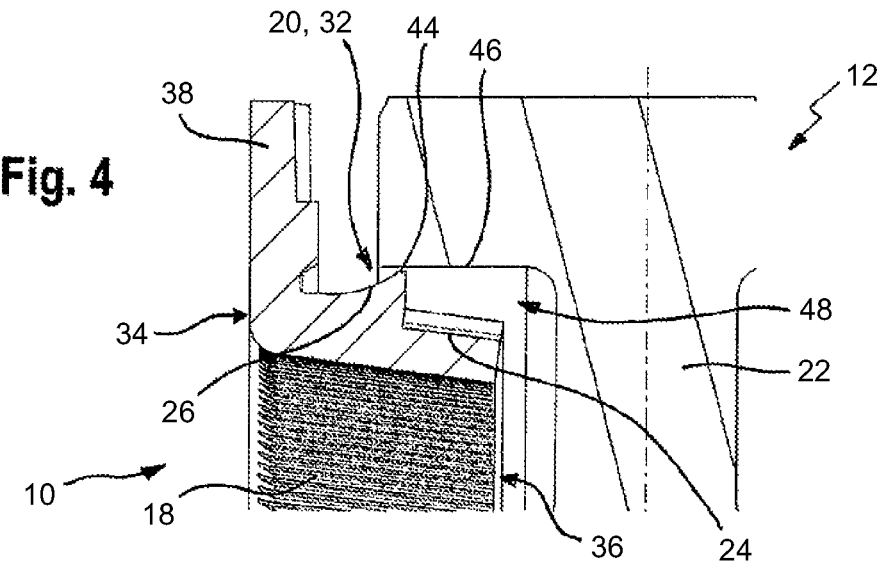

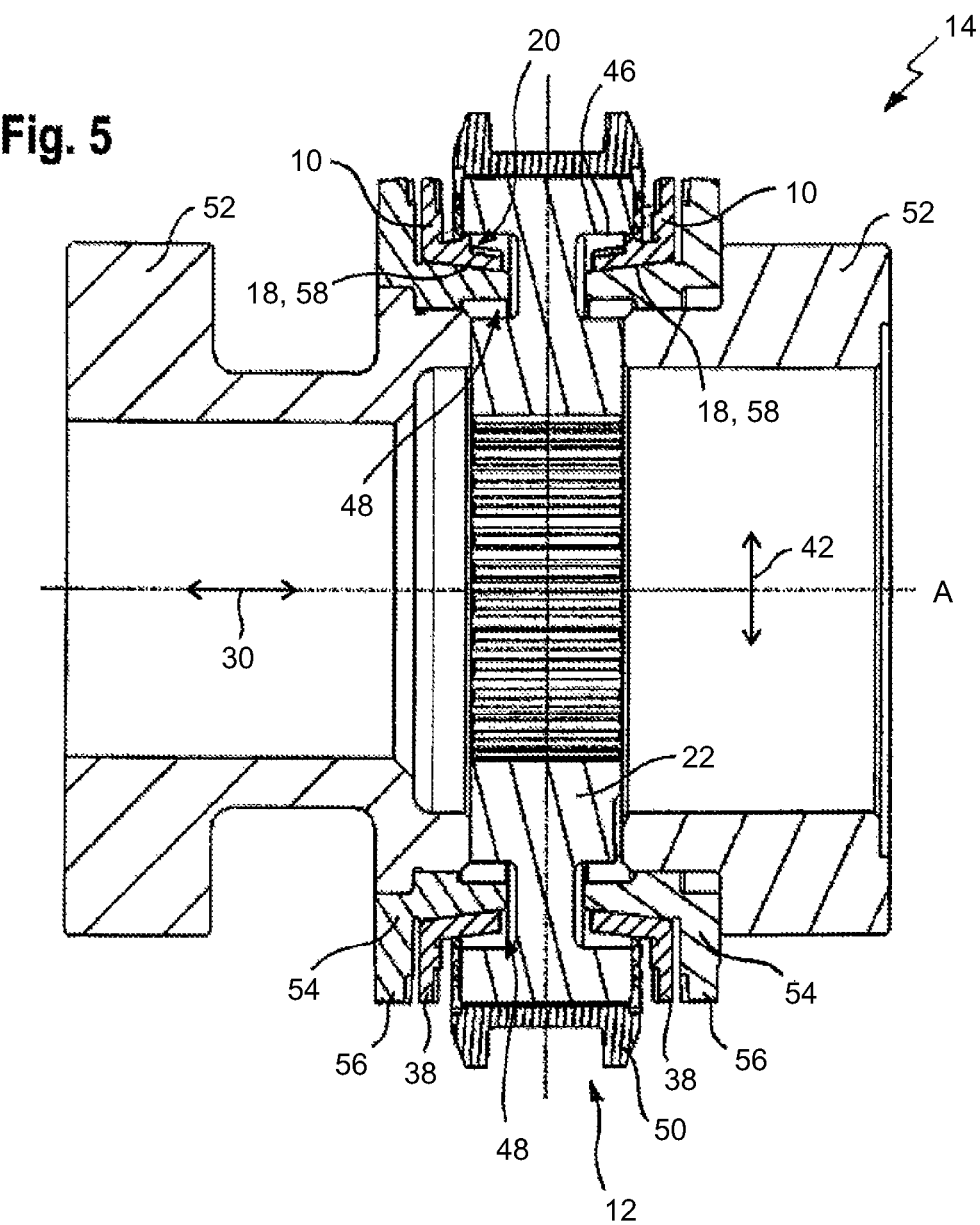

SYNCHRONIZER RING FOR A SYNCHRONIZATION UNIT OF A MANUAL TRANSMISSION AND METHOD FOR MANUFACTURING SUCH SYNCHRONIZER RING

CROSS REFERENCE TO RELATED APPLICATION

The present application claims priority from pending German Patent Application No. 10 2014 107 926.4, filed Jun. 5, 2014, which is incorporated herein by reference.

FIELD

This invention relates to a synchronizer ring for a synchronization unit of a manual transmission and to a method for manufacturing such synchronizer ring, wherein the synchronizer ring has a ring axis and is formed of a ring-shaped sheet-metal cone with a substantially constant sheet thickness, and wherein the ring-shaped sheet-metal cone has a cone-shaped radial outer side and an opposite radial inner side with a cone-shaped friction surface.

BACKGROUND

Synchronizer rings usually are made of a flat sheet by a stamping and drawing method.

One problem of these sheet-metal synchronizer rings consists in centering the same relative to the synchronizer hub of the manual transmission. In contrast to conventional synchronizer rings made of sintered metal or forged synchronizer rings made of brass, which generally have a cylindrical outer surface and thereby can easily be centered in the cylindrical inner cavity of the synchronizer hub, sheet-metal synchronizer rings have a cone-shaped outer surface due to their manufacture. As on shifting of the transmission the synchronizer ring is axially shifted by the selector sleeve in direction of the gear wheel, the centering of the sheet-metal synchronizer ring gets lost due to the taper of the sheet-metal cone towards the smaller diameter. This can lead to a functional impairment of the manual transmission and to a higher wear.

To ensure an exact centering relative to the synchronizer hub also in sheet-metal synchronizer rings, DE 10 2011 015 836 A1 discloses a generic synchronizer ring with a ring-shaped sheet-metal cone, which at an axial end is bent radially to the outside and includes circumferential locking teeth, wherein radially between the locking teeth and the cone ring protrusions are provided for radially centering the synchronizer ring relative to the synchronizer hub.

Proceeding from this prior art, the present invention creates a stable synchronizer ring of particularly simple construction for a synchronization unit of a manual transmission, which is formed of a ring-shaped sheet-metal cone, includes alternative means for radially centering the synchronizer ring relative to the synchronizer hub, and can be manufactured with little procedural expenditure.

SUMMARY

The present invention provides a synchronizer ring synchronizer ring for a synchronization unit of a manual transmission, having a ring axis and being formed of a ring-shaped sheet-metal cone with a substantially constant sheet thickness,
wherein the ring-shaped sheet-metal cone has a cone-shaped radial outer side and an opposite radial inner side with a cone-shaped friction surface,
wherein the ring-shaped sheet-metal cone has an integrally molded centering collar on the radial outer side for radially centering the synchronizer ring relative to a synchronizer hub of the synchronization unit,
wherein the sheet-metal cone is deformed in the region of the centering collar and includes a first sheet portion with a residual thickness reduced as compared to the sheet thickness as well as axially adjacent a second sheet portion with a collar thickness which at least corresponds to the sheet thickness, and
wherein the residual thickness of the sheet-metal cone is substantially constant in the first sheet portion.

In other words, the centering collar is formed of the material of the sheet-metal cone, so that its sheet thickness is at least sectionally reduced. This actually undesired weakening of the cone ring is unproblematic in the present case, as it is effected uniformly in axial direction, so that the weakened first sheet portion has a defined and substantially constant residual thickness. This residual thickness is chosen such that under the loads occurring in operation of the synchronization unit no stability or deformation problems occur at the synchronizer ring.

In one embodiment of the synchronizer ring, the centering collar is interrupted in circumferential direction and preferably comprises several, in particular at least three centering collar portions spaced in circumferential direction. Due to the interruption in circumferential direction, the centering collar is easier to mold integrally during the manufacture, and the sheet-metal cone additionally is weakened only sectionally in circumferential direction. Since the centering collar chiefly serves for radially positioning the synchronizer ring and for a resulting minimization of noise and wear of the synchronization unit, the centering collar also is exposed to rather low loads in operation of the synchronization unit, which can easily be absorbed by few centering collar portions spaced in circumferential direction.

The invention moreover also relates to a method for manufacturing a synchronizer ring as described above, wherein initially a ring-shaped sheet-metal cone is provided, which conically tapers in direction of the ring axis from a first axial cone end to a second axial cone end and does not yet have a centering collar, wherein subsequently a tool for integrally molding the centering collar at the second cone end is adjusted to a desired radial position and by material deformation then is shifted substantially parallel to the friction surface of the sheet-metal cone in direction of the first axial cone end. The tool for integrally molding the centering collar consequently is not moved parallel to the ring axis, which would lead to an undesired, non-uniform weakening of the sheet-metal cone in axial direction, but substantially parallel to the friction surface of the sheet-metal cone, which leads to a defined, uniform weakening and hence to a substantially constant residual thickness of the sheet-metal cone in the first sheet portion. Since the tool consequently also must move in radial direction, when integrally molding the centering collar, it is difficult in terms of manufacture to integrally mold a centering collar extending in circumferential direction. Therefore, several centering collar portions spaced in circumferential direction particularly preferably are provided, which either are integrally molded to the sheet-metal cone one after the other by a single tool or by several tools at the same time.

BRIEF DESCRIPTION OF THE DRAWINGS

FIG. 3 shows a detail section through the synchronizer ring according to FIG. 1 in the region of an integrally molded centering collar;

FIG. 4 shows the detail section of the synchronizer ring according to FIG. 3 together with the synchronizer hub of a synchronization unit; and FIG. 5 shows a longitudinal section through a manual transmission with a synchronizer ring according to FIG. 1.

DETAILED DESCRIPTION

Figure 1:
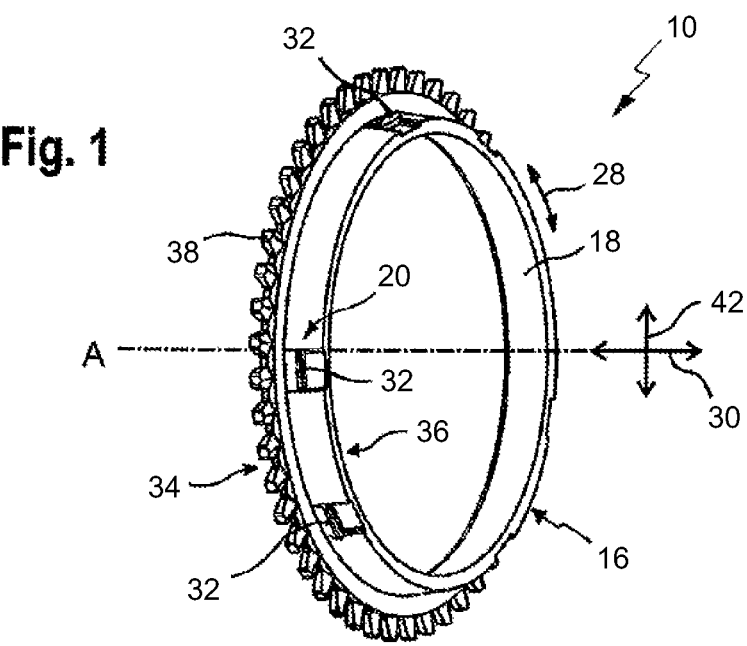
FIG. 1 shows a perspective view of a synchronizer ring according to the invention.
Figure 2:
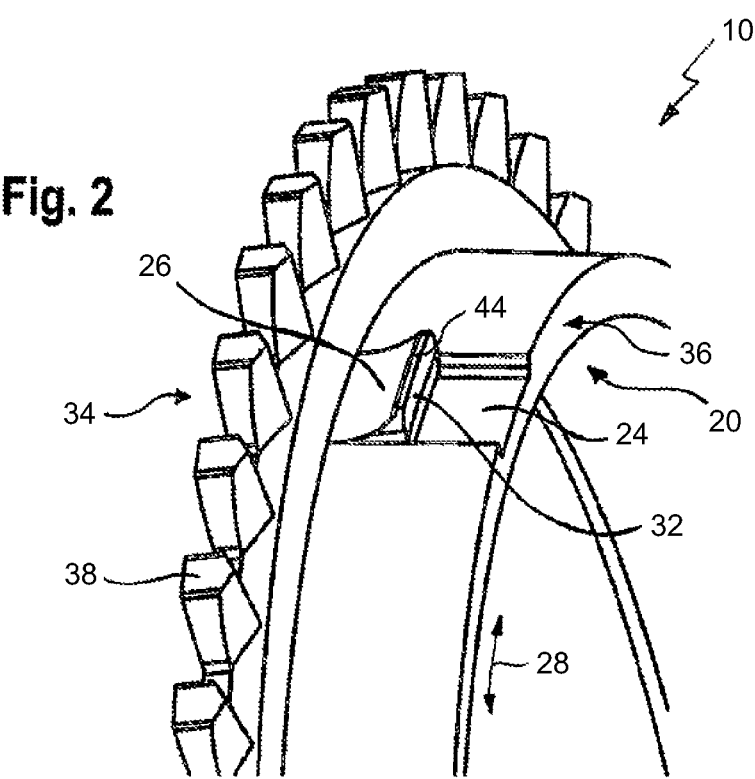
FIG. 2 shows a detail view of the synchronizer ring according to FIG. 1.

FIGS. 1 to 3 show a synchronizer ring 10 for a synchronization unit 12 of a manual transmission 14, which has a ring axis A and is formed of a ring-shaped sheet-metal cone 16 with a substantially constant sheet thickness t.

The ring-shaped sheet-metal cone 16 has a cone-shaped radial outer side as well as an opposite radial inner side with a cone-shaped friction surface 18, wherein the sheet thickness t corresponds to a dimension of the sheet-metal cone 16 vertical to the friction surface 18.

Furthermore, the sheet-metal cone 16 has an integrally molded centering collar 20 on the radial outer side for radially centering the synchronizer ring 10 relative to a synchronizer hub 22 of the synchronization unit 12 (see FIGS. 4 and 5).

The sheet-metal cone 16 is deformed in the region of the centering collar 20 and includes a first sheet portion 24, which can define a groove, with a residual thickness $t_R$ reduced as compared to the sheet thickness t as well as axially adjacent a second sheet portion 26, which can define a protrusion having a curved surface, with a collar thickness $t_B$ which at least corresponds to a sheet thickness t, wherein the residual thickness $t_R$ of the sheet-metal cone 16 is substantially constant in the first sheet portion 24. Concretely, the residual thickness $t_R$ is constant in circumferential direction 28 and in particular also in axial direction 30 within usual manufacturing tolerances.

With reference to FIGS. 1 and 2 it can clearly be seen that the centering collar 20 is interrupted in circumferential direction 28 and comprises several centering collar portions 32 spaced in circumferential direction 28.

To ensure a particularly reliable radial centering of the synchronizer ring 10 relative to the synchronizer hub 22, at least three centering collar portions 32 are provided, which preferably are arranged uniformly distributed around the circumference of the ring-shaped sheet-metal cone 16.

According to FIG. 1, three pairs of centering collar portions are provided, which each consist of two spaced centering collar portions 32 and are arranged uniformly distributed around the circumference of the ring-shaped sheet-metal cone 16.

In the present exemplary embodiment of the synchronizer ring 10 the ring-shaped sheet-metal cone 16 tapers in direction of the ring axis A from a first axial cone end 34 to a second axial cone end 36, wherein the sheet-metal cone 16 is bent radially to the outside at its first axial cone end 34 and includes locking teeth 38.

In the region of the centering collar 20, the first axial cone end 34 axially is adjoined by a second sheet portion 26 with a centering collar portion 32 and subsequently by a first sheet portion 24 which axially extends from the centering collar 20 up to the second cone end 36.

The structural particularity of the substantially constant residual thickness $t_R$ of the sheet-metal cone 16 in the region of the first sheet portion 24 is due to the fact that the centering collar 20 or the centering collar portions 32 are pushed obliquely to the axial direction 30.

When manufacturing the synchronizer ring 10, the ring-shaped sheet-metal cone 16 initially is provided and possibly fixed, wherein the sheet-metal cone 16 conically tapers from its first axial cone end 34 to its second axial cone end 36 and does not yet have a centering collar 20.

According to FIG. 3, a tool 40 for integrally molding the centering collar portions 32 at the second axial cone end 36 subsequently is adjusted to a desired radial position and by material deformation is then shifted substantially parallel to the friction surface 18 of the sheet-metal cone 16 in direction of the first axial cone end 34. As compared to pushing in axially parallel direction, pushing the centering collar 20 parallel to the friction surface 18 prevents an excessive weakening of the sheet-metal cone 16, so that the dimensional stability of the friction surface 18 is ensured both when integrally molding the centering collar 20 and under load. As in contrast to pushing in axially parallel direction, pushing the centering collar 20 parallel to the friction surface 18 does not increasingly weaken the sheet-metal cone 16, the tool 40 can be shifted further in axial direction 30 when integrally molding the centering collar 20, so that larger outside diameters of the centering collar 20 can be realized. Shifting the tool 40 substantially parallel to the friction surface of the sheet-metal cone 16 in particular means that the difference between a cone angle α of the sheet-metal cone 16 and a pitch angle β of the tool 40 maximally is 2°, preferably about 0°.

The individual centering collar portions 32 of the centering collar 20 either can be integrally molded at the same time, wherein to each centering collar portion 32 a tool 40 is associated, or one after the other by a single tool 40.

In a succeeding method step, the centering collar portion 32 then can be deformed in radial direction 42 such that at a desired distance r to the ring axis A an abutment surface 44 is obtained.

FIG. 4 shows the synchronizer ring 10 in a state mounted on the synchronizer hub 22. It can clearly be seen that the radial abutment surface 44 of the centering collar 20 radially adjoins a cylindrical contact surface 46 of the synchronizer hub 22.

According to FIG. 5, this contact surface 46 is part of a hollow cylindrical recess 48 of the synchronizer hub 22, into which the second axial cone end 36 of the synchronizer ring 10 protrudes. Apart from the abutment surface 44 for radially centering the synchronizer ring 10, further abutment surfaces can be formed at the centering collar portions 32, for example abutment surfaces for thrust pieces of the synchronization unit 12.

FIG. 5 shows a longitudinal section through the assembled manual transmission 14, comprising the synchronizer hub 22 which is non-rotatably mounted on a transmission shaft, a selector sleeve 50 which is non-rotatably, but axially shiftably arranged relative to the synchronizer hub 22, two gear wheels 52 which are rotatably, but axially unshiftably arranged on the transmission shaft, and two above-described synchronizer rings 10 for coupling the synchronizer hub 22 with one of the gear wheels 52 of the manual transmission 14 via a frictional connection. According to FIG. 5, this frictional connection each is effected via a coupling body 54 which is non-rotatably and axially unshiftably fixed at an associated gear wheel 52 and moreover includes shifting teeth 56 and a friction surface 58.

In a known way, a speed synchronization between the synchronizer hub 22 and the gear wheel 52 to be shifted initially is effected in a shifting operation via the frictional connection between the friction surfaces 18, 58, and subsequently shifting through of the selector sleeve 50 onto the shifting teeth 56 associated to the gear wheel 52, so that in a shifted position of the manual transmission 14 the synchronizer hub 22 is positively and non-rotatably connected with the corresponding gear wheel 52 via the selector sleeve 50 and the coupling body 54.

The invention claimed is:

1. A synchronizer ring for a synchronization unit of a manual transmission, comprising:
   a ring-shaped cone having a first axial end, a second axial end, a radial outer side, and a radial inner side,
   wherein the ring-shaped cone tapers radially inward from the first axial end toward the second axial end,
   wherein the radial outer side includes a protrusion extending radially outward and having a curved surface and configured for radially centering the synchronizer ring relative to a synchronizer hub,
   wherein the ring-shaped cone has a groove extending axially from the protrusion toward the second axial end and defining an area, and
   wherein the ring-shaped cone has a constant radial thickness in the area of the groove.

2. The synchronizer ring according to claim 1, wherein the ring-shaped cone extends radially outward at its first axial end and includes locking teeth.

3. The synchronizer ring according to claim 1, wherein the protrusion has a radial abutment surface configured for engaging the synchronizer hub.

4. The synchronizer ring according to claim 1, wherein the radial outer side includes a plurality of protrusions spaced circumferentially.

5. The synchronizer ring according to claim 4, wherein a radial outer side includes at least three protrusions.

6. The synchronizer ring according to claim 4, wherein the protrusions are uniformly distributed around the circumference of the ring-shaped cone.

7. The synchronizer ring according to claim 1, wherein the area of the groove defines a first sheet portion of the ring-shaped cone, and the ring-shaped cone further comprises a second sheet portion including the protrusion and extending axially from the first sheet portion to the first axial end, wherein the first sheet portion has a radial thickness that is less than a radial thickness of the ring-shaped cone at a location circumferentially adjacent the first sheet portion, and wherein the second sheet portion has a radial thickness that is greater than or equal to a radial thickness of the ring-shaped cone at a location circumferentially adjacent the second sheet portion.

8. The synchronizer ring according to claim 1, wherein the ring-shaped cone is formed from sheet-metal.

9. The synchronizer ring according to claim 1, wherein the radial outer side and the radial inner side are cone-shaped.

10. The synchronizer ring according to claim 1, wherein the protrusion and the groove are formed by deforming the radial outer side of the ring-shaped cone.

11. The synchronizer ring according to claim 1, wherein the protrusion and the groove are circumferentially aligned.

12. The synchronizer ring according to claim 1, wherein the curved surface of the radial outer side is spaced from the second axial end of the ring-shaped cone.

13. The synchronizer ring according to claim 2, wherein the locking teeth extend circumferentially around the entire ring-shaped cone.

14. A method of manufacturing the synchronization ring according to claim 1, comprising:
   adjusting a tool for integrally shaping the protrusion of the ring-shaped cone to a desired radial position relative to the second axial end of the ring-shaped cone; and
   axially moving the tool relative to the ring-shaped cone substantially parallel to the radial inner side of the ring-shaped cone from the second axial end toward the first axial end, thereby deforming the radial outer side of the ring-shaped cone and forming the protrusion.

* * * * *